INVENTOR.
ALAN WILKERSON
BY
Lieber & Miller
ATTORNEYS

United States Patent Office 3,475,671
Patented Oct. 28, 1969

3,475,671
REGENERATIVE DIRECT CURRENT MOTOR CONTROL HAVING IMPROVED CIRCUIT MEANS
Alan W. Wilkerson, Thiensville, Wis., assignor to Web Press Engineering, Inc., Addison, Ill., a corporation of Illinois
Filed Jan. 3, 1967, Ser. No. 606,914
Int. Cl. H02p 5/04, 7/04; H02k 7/12
U.S. Cl. 318—302                                    14 Claims

ABSTRACT OF THE DISCLOSURE

A regenerative direct current motor control provides proper controlling signals to both a field circuit and the armature circuit from a bi-polarity error signal to the control. The regenerative direct current motor control includes circuit means which reduces the armature energization rapidly to zero at the initiation of the transient period during which the field current reverses to prevent motor speed increases or commutator sparking as the motor field weakens and reverses.

Background of the invention—Field of the invention

The invention relates to regenerative direct current motor controls which provide regenerative braking to a direct current motor by reversing the applied voltage while maintaining armature current flow in the same direction.

Background of the invention—Description of the prior art

Many applications of direct current motors require the motor to be braked during operation. For example, extremely accurate speed control may require that the motor be braked as soon as it exceeds a desired speed. Other examples include direct current motors subjected to overhauling loads, as in crane, hoist, and elevator service.

A highly desirable method of braking direct current motors is regenerative braking. It is also desirable to provide such regenerative braking by means of static, or non-rotating, apparatus so as to avoid the mechanical problems and limitations associated with rotating machines. Such static apparatus generally comprises electronic circuitry.

In regenerative braking, the power generated by the motor during braking is supplied back to the active power source for the motor, rather than being circulated through a passive resistor load. Power may be regenerated, or supplied back to the active power source for the motor, by reversing the polarity of the armature voltage while maintaining armature current flow in the same direction so that the motor that was formerly a load becomes a power source. The advantages of such a system include the fact that the braking may be done on a permanent basis, whereas dynamic or other electrical braking methods are normally utilized only for transient conditions or for isolated stops. Also, with proper control, the armature current may be limited, thereby eliminating the excessive motor heating experienced with other methods of braking. Braking may also be accomplished very rapidly.

Regenerative controls or apparatus of the type with which the present invention is concerned are generally operable by a bi-polarity error signal, the polarity of which indicates whether the actual condition of the motor, as represented by a feedback signal is, in excess of, or less than, the desired condition of the motor, as indicated by a reference signal. Such controls provide for motoring operation of the motor in response to one polarity of the signal by serving as a source of power and circulating current through the armature of the motor as a load in a given direction and provide for regenerative operation of a motor in response to the other polarity of error signal by continuing to pass armature current in the same direction while the voltage at the output terminals of the control reverses so that the control becomes a load for the motor armature.

Reversal of the voltage at the terminals of the control is obtained through the use of an alternating current power source. Alternating current, of course, contains one polarity of voltage during its positive half cycle and the other polarity of voltage during its negative half cycle. Such a power source thus may supply either polarity of voltage to the input terminals of the control depending on the point during the alternating current cycle at which the power source is connected to the control. This connection may be obtained and controlled by electronic means such as a controlled rectifier bridge.

During regenerative operation, to cause the motor to become a source for the control, the energization of the motor field is reversed in response to the polarity reversal of the error signal. This reverses the motor flux and the polarity of the counter E.M.F., assuming the direction of motor rotation remains instantaneously the same. The reversed counter E.M.F. biases the controlled rectifiers in the bridge to conduct current in the same direction as motoring any time the counter E.M.F. is more negative than the applied alternating current voltage from the power source. This will include a portion of the negative half cycle of alternating current power, permitting the reversal of voltage at the control terminals necessary for regenerative operation.

A particularly troublesome problem in the design and operation of this type of regenerative direct current motor control in the past has been the proper regulation and protection of both the motor and the control during the transient period between motoring and regenerative operation. In this period, the control is neither motoring nor regenerating. The transient period occurs because the motor field, or more accurately, the direction of current flow through the motor field, cannot be instantaneously reversed due to the inductance of the field. This may be seen graphically by reference to FIGURE 3. If at the time $T_1$, it is desired to change, for example, from motoring operation to regenerative operation, the polarity of the error signal to the control is reversed to cause a signal to be applied to the motor field to de-energize the field in one direction and re-energize it in the other. This initiates the transient period. The field current decays from its energization in one direction to zero, at time $T_2$, and rises to the desired energization in the opposite direction at time $T_3$. The graph of the field current is indicated by the numeral 6. The exact decay and rise of the motor field current for any given motor field will depend on its individual inductive characteristics.

It is highly desirable to have zero armature current when the motor field is weak or near zero, so as to prevent commutator sparking due to armature reaction. This generally necessitates that the armature circuit be de-energized by removing the controlling signal to it which otherwise regulates the motor armature energization during motoring and regenerative operation. For example, in FIGURE 3, the controlling signal may be removed at time $T_1$ and remain removed until the field reverses at time $T_2$. However, this causes the armature circuit to operate in a manner uncontrolled by the remainder of the control and unresponsive to the magnitude or condition of the error signal. Further, as it is often necessary to incorporate time constants in the armature circuit to provide stability to the control, such time constants prevent the armature from reaching zero energization by the time the field has weakened. The armature energization declines to zero along the graph 7 of FIGURE 3.

Thus, successful regenerative motor controls have included circuit means in the armature circuit which did more toward deenergizing the armature than merely removing the controlling signal to the armature circuit at the initiation of the transient period. One such motor control included a clamping circuit in the armature circuit which de-energized the motor armature when the field had weakened to a desired degree. The operation of such a circuit is shown by graph 7A in FIGURE 3. However, as the armature circuit was deenergized at the slow rate determined by the circuit time constant, prior to the clamping action, it was energized for a major portion of the time in which the motor field was weakening. The motor, as does any direct current motor, had a tendency to increase its speed due to the field weakening. This, of course, was opposite of what was desired when regenerative braking was initiated and was particularly troublesome in the case of overhauling loads.

Other prior art controls have contained circuit means in the armature circuit which utilized an armature current negative feedback signal to reduce the armature energization when the controlling signal was removed. But as the armature current was reduced, the feedback signal was reduced, causing a reduction in the rate at which the armature current decreased, so that the armature current often did not reach zero by the time the field had weakened.

Neither of these prior art controls provided a controlling signal to the armature circuit from the remainder of the control which was of a nature to cause a rapid reduction of the armature current to zero at the initiation of the transient period period so as to prevent commutator sparking or motor speed-up.

The prior art, has therefore, indicated the need for a regenerative direct current motor control which will provide the desired controlling signals to both the field circuit and the armature circuit and, particularly, for a control incorporating a means which will provide a controlling signal to the armature circuit to reduce the armature energization rapidly to zero at the initiation of the transient period between motoring and regenerative operation to prevent commutator sparking under weak field conditions and motor speed-up due to field weakening. It is an object of the present invention to provide such a control.

Summary of the invention

In summary, the present invention provides a regenerative direct current motor control for regulating the field and the armature of a direct current motor from a power source in accordance with a bi-polarity error signal. The control provides regenerative operation by reversing the motor field current through the transient period in response to a reversal of the polarity of the error signal. The control includes a field circuit operable by a bi-polarity input signal, corresponding to the bi-polarity error signal, which energizes the field of the direct current motor from the power source to provide current energization of one polarity through the motor field in response to an input signal of one polarity and reverses the field current energization through zero during a transient period to provide current energization of the other polarity through the motor field in response to an input signal of the other polarity. The field circuit also includes means providing field current polarity signals.

The control includes an armature circuit connected to the armature of the motor. The armature circuit energizes the armature from the power source in response to a controlling signal of one polarity and reduces the armature energization to zero in response to a controlling signal of the other polarity. Energization of the armature provides motoring operation to the motor for one direction of field current and provides regenerative operation to the motor for the other direction of field current, assuming a direction of motor rotation remains the same.

The control also includes a circuit means connected to the armature circuit which is operatively associated with the bi-polarity error signal and is connected to the means providing field current polarity signals. The circuit means is operable by the field current polarity signals to supply to the armature circuit a controlling signal corresponding to the error signal and the polarity to energize the motor armature prior to, and subsequent to, the transient period and to supply the armature circuit with a controlling signal corresponding to the error signal but of the polarity to reduce the armature energization to zero after the initiation of the transient period.

Brief description of the drawings

The following drawings form a part of the specification.

Description of the preferred embodiments

Figure 1:
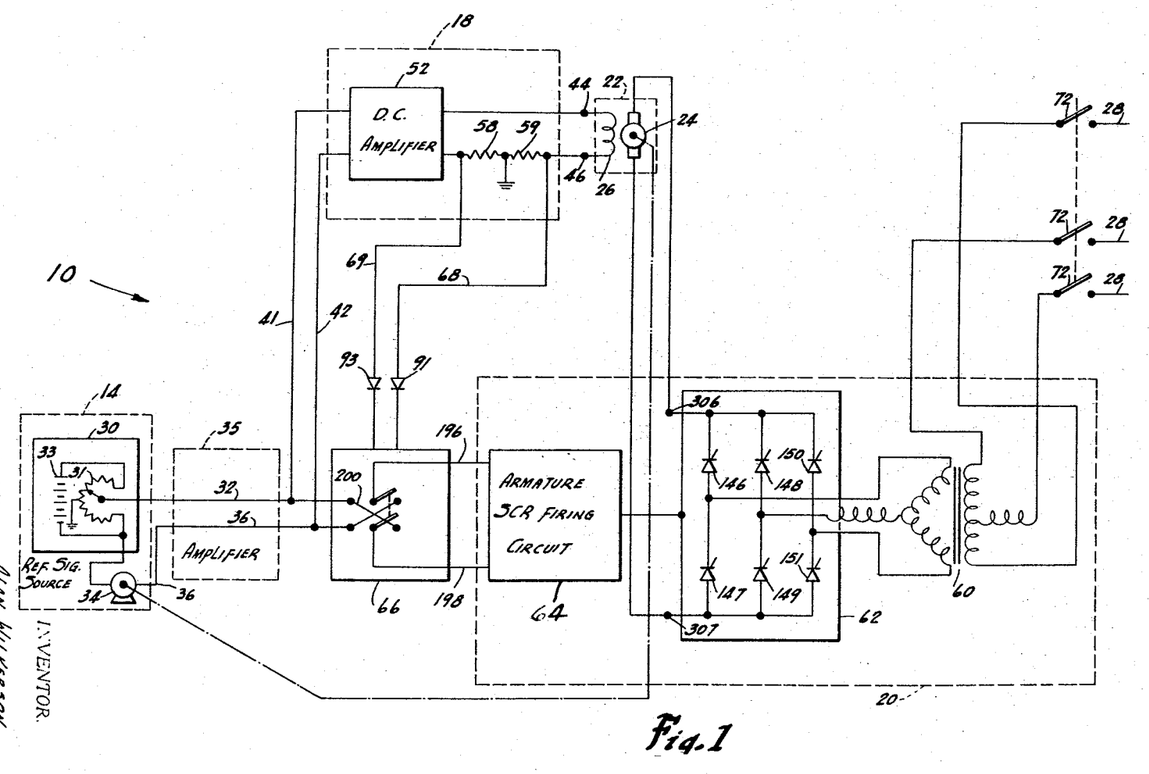
FIGURE 1 is a schematic diagram of one embodiment the regenerative direct current motor control of the present invention.

Referring now to the figures, and particularly to FIGURE 1, there is shown therein a regenerative direct current motor control of the type to which this invention pertains. Control 10 includes a reference and feedback circuit 14, field circuit 18, and armature circuit 20. The control drives a direct current motor 22 having an armature 24 and a field 26. The control is provided with input power from multi-phase AC lines 28. While multi-phase AC lines are shown in FIGURE 1, it will be appreciated that single-phase AC may be used if desired.

Reference and feedback circuit 14 includes a reference signal corresponding to the speed of armature 24 to conductor 32 by means of DC supply 33 and potentiometer 31. The feedback signal is provided by tachometer 34 which is connected to armature 24 and supplies a DC signal coresponding to the speed of armature 24 to conductor 36. The feedback signals corresponding to other operative conditions in the motor, such as torque, or operative conditions in the apparatus driven by the direct current motor, as for example, web tension, may be used. Hence, the control is not to be construed solely as a motor speed control. The difference between the reference signal in conductor 32 and the feedback signal in conductor 36 forms the error signal to control 10. This error signal may be of either polarity, that is, the reference signal in conductor 32 may be positive with respect to the feedback signal in conductor 36 or the feedback signal in conductor 36 may be positive with respect to the reference signal in the conductor 32. The error signal serves as a motoring signal in one polarity and a regenerative braking signal in the other polarity. The error signal may be amplified by amplifier 35, if desired.

Field circuit 18 includes motor field 26. The field is energized in polarity and magnitude of current by a means, such as bi-polarity DC amplifier 52, which circulates current in either direction through motor field 26.

D.C. amplifier 52 is operable by a bi-polarity input signal in conductors 41 and 52 which may be either the unamplified, or amplified, error signal between conductors 32 and 36. For example, D.C. amplifier 52 may provide field current in terminal 44 of field 26 when the reference signal in conductor 32 is positive with respect to the feedback signal in conductor 36 and provide current in terminal 46 of field 26 when the feedback signal in conductor 36 is positive with respect to the reference signal in conductor 32. D.C. amplifier 52 may provide for the weakening of field 26 if it is desired to extend the range of operation of control 10. A means of sensing the polarity and magnitude of the current in motor field 26, such as resistors 58 and 59, is also provided in the field circuit 18. The sensings are provided to conductor 68 and 69.

Armature circuit 20 is supplied with power from alternating current supply lines 28 through transformer 60. The energization of motor armature 24 is controlled by armature controlled rectifier bridge 62 containing controlled rectifiers 146 through 151. Bridge terminals 306 and 307 constitute the output terminals of control 10.

Armature controlled rectifier firing circuit 64 controls the operation of the rectifiers in armature controlled rectifier bridge 62. In order for the control to provide regenerative operation by reversing the voltage at terminals 306 and 307 while maintaining the armature current in the same direction, armature controlled rectifier firing circuit 64 must be capable of controlling the operation of the controlled rectifiers through one entire half cycle of alternating current from supply lines 28 and through a portion of the other half cycle. Armature controlled rectifier firing circuit 64 is a circuit which amplifies and converts a controlling input signal thereto into an output signal suitable for operating armature controlled rectifier bridge 62. Firing circuit 64 contains the aforementioned circuit time constants necessary for stable operation of the armature circuit. It is constructed to amplify input signals of one polarity, as for example, the positive polarity, to provide an output signal to the rectifier bridge which causes the latter to provide a current to energize motor armature 24 during both motoring and regenerative braking. Input signals of the opposite polarity force firing circuit 64 off and cause the bridge output and armature energization to the reduced to zero. The larger the opposite polarity input signal to firing circuit 64, the more rapid the reduction. Removal of all input signals to the firing circuit allows the signal to rectifier bridge 62 and the armature energization to drop to zero in accordance with the circuit time constants.

A firing circuit suitable for use in control 10 is shown in U.S. patent application, Ser. No. 499,409, filed Oct. 21, 1965, by the same inventor.

Armature control rectifier firing circuit 64 may contain appropriate circuitry to limit the armature current during both motoring and regenerative operation.

Circuit means 66 provides a controlling signal to armature circuit 20, and specifically, to armature controlled rectifier firing circuit 64 so as to energize the armature in the above described manner during motoring and regenerative braking. Additionally, circuit means 66 provides a controlling signal to the armature circuit at the initiation of the transient period between motoring and regenerative operation which reduces the armature current energization to zero to prevent motor speed increases or commutator sparking as the motor field weakens and reverses. As shown in FIGURE 1, circuit means 66 includes a switching means, such as reversing switch 200, shown diagrammatically in the figure. This switch may be connected to conductors 32 and 36 to receive the bi-polarity error signal existing between them. The output of circuit means 66 is supplied to armature controlled rectifier firing circuit via conductors 196 and 198 as the controlling signal thereto. The switching means is operated by the field current polarity signals in conductors 68 and 69.

Figure 5:
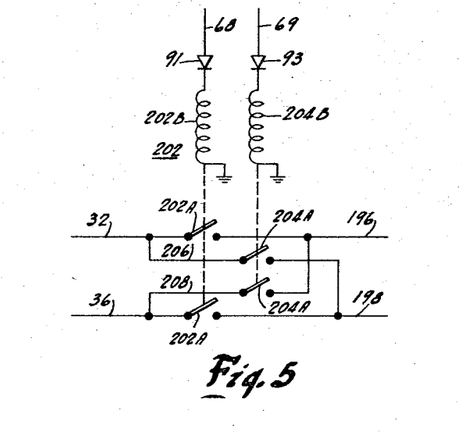
FIGURE 5 is a general schematic diagram of a circuit means incorporated in one embodiment of the control of the present invention.

A circuit which may be employed as circuit means 66 is shown in FIGURE 5. Reversing switch 200 comprises two relays. The switching contacts 202A of relay 202 are connected in conductors 32 and 36 so that when the contacts are closed, by the energization of relay coil 202B, signals of the magnitude and polarity of the signals existing in conductors 32 and 36 are supplied to conductors 196 and 198, respectively. Relay coil 202B is energized by the field current polarity signal in conductor 68.

The switching contacts 204A of relay 204 are connected in reversing connectors 206 and 208. Reversing connector 206 connects conductor 32 to conductor 198 while reversing connector 208 connects conductor 36 to conductor 196. Relay 204 is operated by the energization of relay coil 204B by the field current polarity signal in conductor 69. When switching contacts 204A are closed, the signal in conductor 32 is supplied to conductor 198 and the signal in conductor 36 is supplied to conductor 196 so that the polarity of the error signal in conductors 32 and 36 supplied to conductors 196 and 198 and the controlling signal to armature controlled rectifier firing circuit 64 is effectively reversed.

To operate control 10 in motoring operation, signal source 30 is adjusted to provide a signal corresponding to the desired motoring speed. This signal may, for example, be of the positive polarity and is supplied to conductor 32. As armature 24 is not yet rotating, there will be no feedback signal supplied by tachometer 34, so that the bi-polarity error signal to control 10 is of the magnitude and polarity of the reference signal in conductor 32.

Field circuit 18 utilizes the signal in conductor 41 corresponding to the error signal in conductor 32 to energize motor field 26. For example, the field current may flow in terminal 44 and out terminal 46. This provides current energization through motor field 26 which is sensed by resistors 58 and 59 to provide field current polarity signals in conductors 68 and 69 to circuit means 66. The signal in conductor 32 is supplied to circuit means 66. In the present exemplary case, the field current polarity signal in conductor 68 is of a polarity to pass through diode 91 to energize relay coil 202B to close relay contacts 202A and supply the reference signal existing in conductor 32 to conductor 196 and to the input of armature controlled rectifier firing circuit 64. This signal serves as the controlling signal for firing circuit 64 and is positive, as shown by the numeral 8 in FIGURE 4, to operate armature controlled rectifier firing circuit 64 to energize motor armature 24 through controlled rectifier bridge 62 to accelerate the armature. The field current polarity signal in conductor 69 is blocked by rectifier 93 and does not energize relay 204.

Acceleration of armature 24 causes tachometer 34 to generate a feedback signal in conductor 36 which reduces the magnitude of the error signal existing between conductors 32 and 36. As the signal in conductor 36 is supplied to conductor 198 through closed relay contacts 202A, the magnitude of the controlling signal to armature controlled rectifier firing circuit 64 is likewise reduced. This causes armature controlled rectifier firing circuit 64 to retard the firing angle of the controlled rectifiers in armature controlled rectifier bridge 62 to reduce the energization of armature 24. Regulation of the speed of armature 24 is obtained by controlling the point of firing of the controlling rectifiers in armature controlled rectifier bridge 62 in response to the controlling signal supplied to firing circuit 64 by conductors 196 and 198.

Regenerative operation of control 10 may be brought on by reducing the reference signal in conductor 32 or by providing an overhauling load to armature 24. In either case, the feedback signal generated by tachometer 34 in conductor 36 exceeds the reference signal generated by reference signal source 30 in conductor 32. This reverses the polarity of the error signal between the two conductors and the error signal to control 10. This may occur at time $T_1$ in FIGURE 4. The reverse polarity of the input signal to amplifier 52 in conductors 41 and 42 causes the amplifier to energize motor field 26 by supplying current in terminal 46 and out terminal 44. The current in motor field 26 starts to decay at a rate determined by the inductance of motor field 26 and the voltage applied by amplifier 52 as shown by the graph 6 in FIGURE 4.

Considering now the operation of armature circuit 20, at time $T_1$, or shortly thereafter, the reversed polarity signal in conductors 32 and 36 is supplied to relay 202 in circuit means 66. However, as the polarity of a field current polarity signal in relay coil 202B has not reversed, but is only decreasing, the state of relays 202 and 204 is unchanged. That is, relay 204 remains unenergized and has no effect on the operation of circuit means 66. Relay 202 having contacts 202A closed, continues to supply the signals in conductors 32 and 36 to conductors 196 and 198, respectively, and the error signal between the signal in conductor 32 and the signal in conductor 36 forms the controlling signal 8 to armature circuit 20.

As the controlling signal is of the opposite polarity, i.e. negative polarity, from the controlling signal prior to time $T_1$, that is, during motoring operation, because the feedback signal in conductor 36 exceeds the reference signal in conductor 32, it is of a polarity to force the output of armature controlled rectifier firing circuit 64 immediately to zero, which, in turn, reduces the armature energization to zero. The reduction of the armature energization to zero will be quite rapid, particularly if amplifier 35 is employed to amplify the error signal and will be far more rapid than the energization reduction provided by an armature current feedback signal only or by the time constant of the armature circuit in the absence of a signal thereto.

The forcing provided by circuit means 66 continues until just prior to the time the field current reaches zero. When the field current approaches zero, as for example at time $T_{2A}$, in FIGURE 4, the magnetic field current polarity signal in relay coil 202B becomes insufficient to hold switch contacts 202A together and relay 202 opens. This removes the controlling signal 8 from the firing circuit 64.

Figure 4:
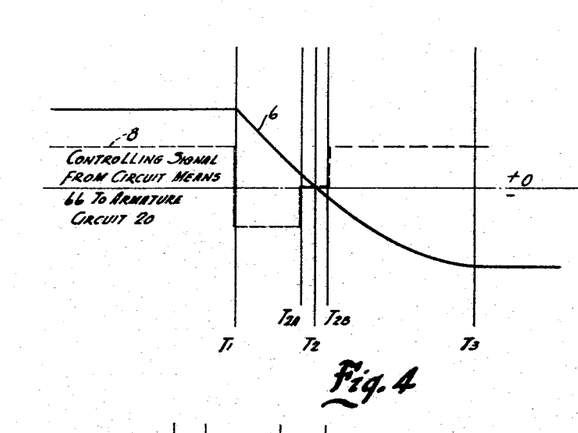
FIGURE 4 is a graph showing electrical conditions existing in the regenerative direct current motor control of the present invention.

At time $T_2$, the field current falls to zero and starts to reverse. At time $T_{2B}$, a field current in the opposite direction has built up to a magnitude sufficient to cause a reversed field current polarity signal in conductor 69 which energizes relay coil 204B to close relay contacts 204A. This reverses the connection of conductor 32 and conductor 36 to conductor 196 and conductor 198, respectively, and connects conductor 32 to conductor 198 via conductor 206 and conductor 36 to conductor 196 via conductor 208. Due to the double reversal of the polarity of the error signal, i.e. the initial reversal caused by the feedback signal in conductor 36 exceeding the reference signal in conductor 32, and the second reversal caused by the closing of relay contacts 204A, the polarity of the controlling signal 8 supplied to armature controlled rectifier firing circuit 64 is now the same as initially occurred under motoring conditions, that is, positive. This positive error signal is now such as to tend to increase the energization of motor armature 24. The signal operates armature controlled rectifier firing circuit 64 to fire the controlled rectifiers in bridge 62 in the portion of the negative half cycle of the AC supply in which the AC supply voltage is more positive than the reversed counter E.M.F. to cause motor 24 to regenerate power back to the AC supply.

The regeneration of power back to the AC supply will brake the speed of motor 22. When sufficient braking has been applied to reduce the speed of motor 22 to the desired speed, as indicated by the reference signal in conductor 32, the feedback signal in conductor 36 will approach, equal, and again become less than the reference signal. This will prepare control 10 for motoring operation by reversing polarity of the error signal to the conductors 32 and 36 back to its original or motoring polarity. The error signal between conductor 32 and 36 will, through amplifier 52, initiate the reversal of the direction of current flow through motor field 26 back to its original direction of current flow in terminal 44 and out terminal 46.

During the initial portion of this transient period, prior to the time the field current reverses, the controlling signal supplied to armature controlled rectifier firing circuit 64 will be supplied through closed relay contacts 204A and will be of the reversed or negative polarity. This will force the output of armature controlled rectifier firing circuit 64 to zero which, in turn, reduces the energization of armature 24 rapidly to zero so that the armature is de-energized as the field weakens and reverses. When the field current has reversed, relay 204 is opened and relay 202 is closed by the reversal of the field current polarity signals in conductors 68 and 69. Relay 202 supplies a controlling signal of the original, positive, and motoring polarity to conductors 196 and 198 and to armature controlled rectifier firing circuit 64 to cause that circuit to operate armature rectifier bridge 62 to energize armature 24. Motor 22 then resumes operation in the motoring state under the control of the reference signal in conductor 32 and the feedback signal in conductor 36.

Figure 2:
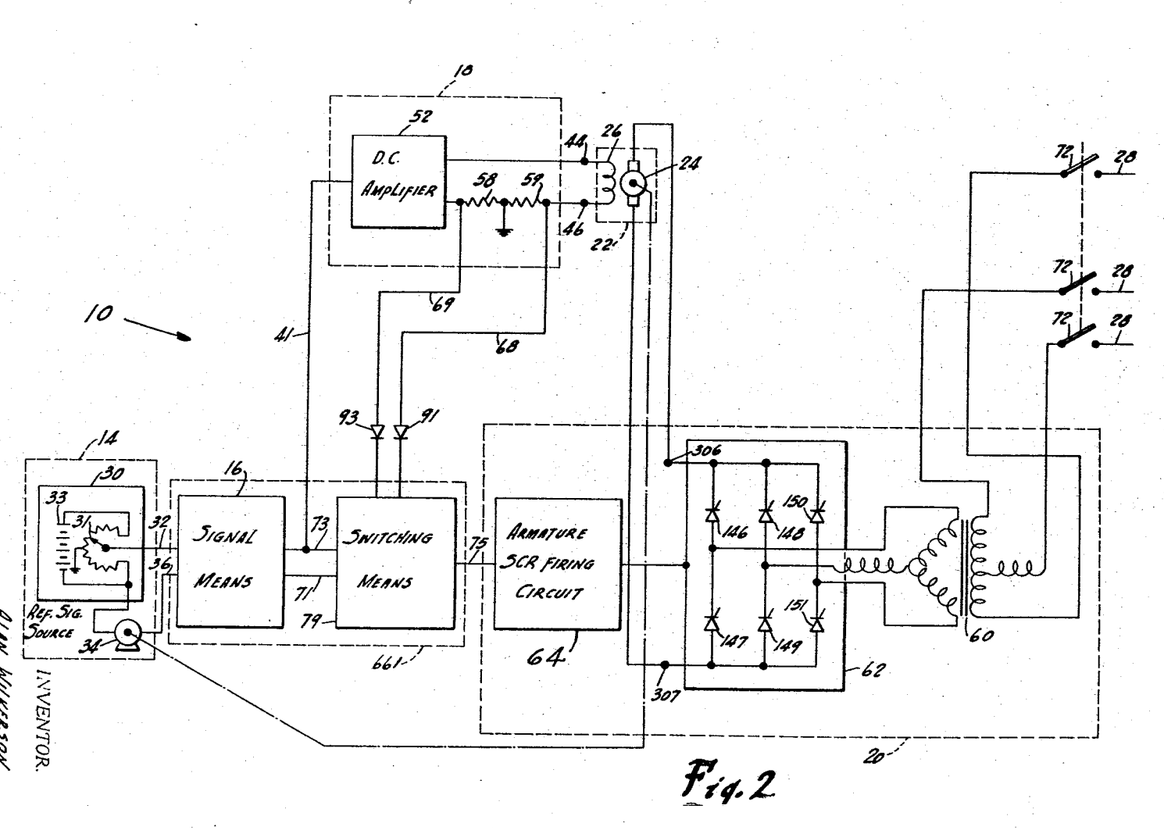
FIGURE 2 is a schematic diagram of another embodiment of the regenerative direct current motor control of the present invention.
Figure 6:
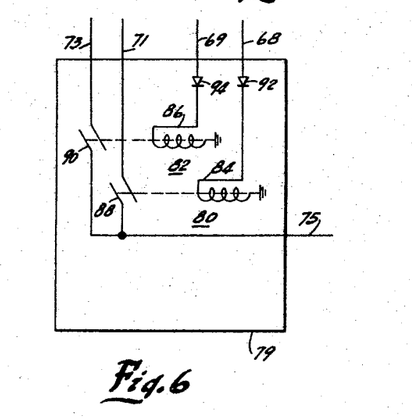
FIGURE 6 is a general schematic diagram of a circuit means employed in the other embodiment of a control of the present invention.
Figure 7:
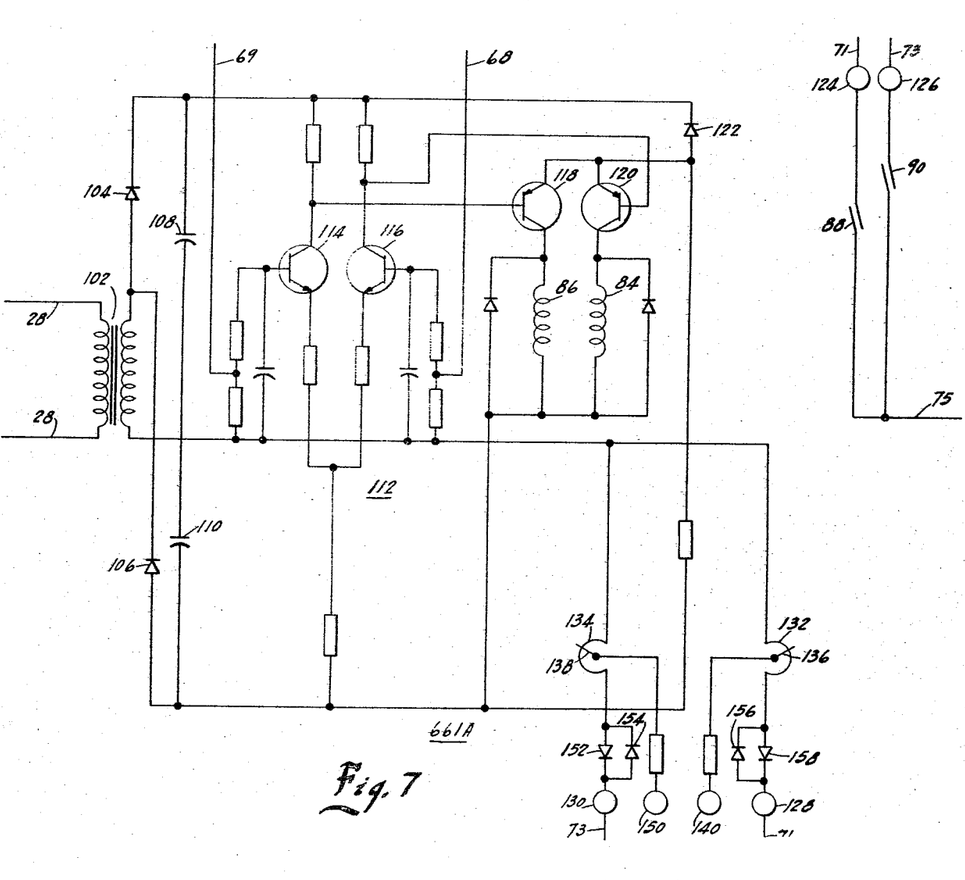
FIGURE 7 is a detailed schematic diagram of the circuit means shown in FIGURE 6.

FIGURES 2, 6, and 7, show another embodiment of the present invention which likewise provides a controlling signal to the armature circuit of a regenerative direct current motor control. Similar elements have been given similar numerical designations in the figures. The embodiment of the FIGURES 2, 6, and 7, similar to the embodiment previously described, includes a circuit means 661 containing a switching means 79. In addition, the circuit means 661 of the embodiment of FIGURES 2 and 6 contains a signal means 16 which provides a pair of output signals.

The signal means 16 is connected to the control error signal and provides a pair of output signals of opposite polarities. One such signal may be termed a direct output signal as it is directly proportional in magnitude and polarity to the error signal. The other such output signal may be termed the inverse output signal as it is proportional in magnitude but inverse in polarity to the error signal. The polarity of each of the pair of signals, of course, reverses as the polarity of the error signal reverses. One polarity of the pair of signals corresponds to the polarity of a controlling signal necessary to energize the armature while the other polarity of the pair of signals corresponds to the polarity of the controlling signal necessary to reduce the armature energization to zero.

As noted, circuit means 661 includes switching means 79 connected to the signal means 16 and receiving the pair of output signals of that means as switched signals. The switching means is capable of transmitting either polarity of each of the output signals. The switching means is connected to field current polarity signals in conductors 68 and 69 which open and close the switching means to supply, when the switching means is closed, the one of the pair of signals which is of the polarity to energize the armature circuit prior to the initiation of the transient period and of the polarity to de-energize the armature circuit subsequent to the initiation of the transient period. Thus, while circuit means 66 of FIGURES 1 and 5 functions as a reversing means to reverse the polarity of a single error signal supplied as the controlling signal to the armature circuit, circuit means 661 functions as a selection means to select the desired one of a pair of signals produced by the signal means and supply that signal as the controlling signal to the armature circuit.

Reference and feedback circuit 14 of FIGURE 2 may be similar to that of FIGURE 1. The error signal between conductor 32 and conductor 36 is fed to the signal means 16 which provides two output signals proportional to the error signal. Such a means may comprise an operational amplifier. A typical circuit which may be employed as operational amplifier 16 is shown on page 119 of the Transistor Manual, published by the General Electric Company, seventh edition, 1964. Both of the signals from operational amplifier 16 are proportional in magnitude to the error signal. However, the polarity of one output signal is the same as the polarity of the input error signal, and is termed the direct output signal, while the other output signal is of the opposite polarity from the input error signal and is termed the inverse output signal. Both of the output signals are used, at differing times, to control armature circuit 20, while one of the signals may be used, in addition, to control field circuit 18. While FIGURE 2 shows the inverse output signal of operational amplifier 16 as being supplied to field circuit 18, via conductor 41, the direct output signal may be used and the construction of controls 10 is not to be interpreted as limited to the connection as shown in FIGURE 2. Field circuit 18 may be energized directly from the error signal between conductor 32 and conductor 36 if desired.

As shown in FIGURE 6, switching means 79 includes switches 80 and 82 in conductors 71 and 73 which contain the direct output signal and the inverse output signal, respectively, of operational amplifier 16. Switches 80 and 82 selectively connect either conductor 71 or conductor 73 to conductor 75 when closed. The pair of bi-polarity output signals of operational amplifier 16 in conductors 71 and 73 form the switched signals for switches 80 and 82. Conductor 75 connects circuit means 661 to armature controlled rectifier firing circuit 64 to supply one or the other of the bi-polarity signals in conductors 71 or 73 as the controlling signal to armature controlled rectifier firing circuit 64.

The switches are operated by the field current polarity signals in conductors 68 and 69 which form the switching signals for switches 80 and 82. For illustrative purposes, the field current signals are shown as energizing coils 84 and 86 which are operatively associated with switch contacts or leaves 88 and 90. So that only one polarity of each of the field current signals in conductors 68 and 69 may operate switches 80 and 82, respectively, a means such as diodes 92 and 94 may be inserted in conductors 68 and 69. Switch leaves 88 and 90 may be encased in hermetic vials, not shown, with coils 84 and 86 surrounding the vials so as to form magnetic reed switches. A magnetic reed switch of such construction which may be used in switching means 79 is that manufactured by Struthers-Dunn, Inc., Pittman, N.J. under Part #MRR1A. If desired, of course, a relay or switching transistor or other semi-conductor switching means may be utilized. However, a magnetic reed switch has a sufficiently fast switching action, when compared with the inductive time constant of the motor field, to be satisfactory in operation and also provides a better open circuit and closed circuit than does a switching transistor or semi-conductor switching device. A magnetic reed switch may easily pass switched signals of either polarity. Additionally, the isolation of the switching signals and the switched signals in the magnetic reed switch is simpler than in a transistor switch.

The operation of control 10 of FIGURE 2 is similar to the operation of control 10 of FIGURE 1. Signal source 30 is adjusted to provide a signal corresponding to the desired motoring speed. A signal is supplied through conductor 32 to operational amplifier 16. The operational amplifier produces a direct output signal and an inverse output signal proportional to the input signal in conductor 32. As armature 24 is not yet rotating, there will be no feedback signal supplied by tachometer 34.

Field circuit 18 utilizes the inverse output signal of operational amplifier 16 to energize motor field 26. For example, the field current may flow in terminal 44 and out terminal 46. This provides current energization through motor field 26 which is sensed by resistors 58 and 59 to provide field current polarity signals in conductors 68 and 69 to circuit means 661.

Both the inverse output signal and the direct output signal of operational amplifier 16 are supplied to switching means 79 by conductors 71 and 73, respectively. In an exemplary case, the field current polarity signal in conductor 68 is of a polarity to pass through rectifier 94 to close switch 80 and supply a direct output signal of operational amplifier 16 existing in conductor 71 to conductor 75 and to the input of armature controlled rectifier firing circuit 64 as the controlling signal thereto. The polarity of the direct output signal of operational amplifier 16 is positive, as shown by the numeral 8 in FIGURE 4 and operates armature controlled rectifier firing circuit 64 to energize motor armature 24 through controlled rectifier bridge 62 and accelerate the armature. The field current polarity polarity signal in conductor 69 is blocked by rectifier 92 and does not energize switch 82 so that the inverse output signal in conductor 73 is not, at present, utilized.

Regenerative operation of control 10 may be brought on by reversing the polarity of the error signal supplied to operational amplifier 16 and hence the polarity of the inverse output signal and the direct output signal of operational amplifier 16. This may occur at time $T_1$ in FIGURE 4. The reversed polarity of the inverse output signal from operational amplifier 16 to amplifier 52 causes the latter circuit to energize motor field 26 by supplying current in terminal 46 and out terminal 44. The current in motor field 26 starts to decay at a rate determined by the inductance of motor field 26 and the voltage applied by amplifier 52.

Considering now the operation of armature circuit 20 at time $T_1$, or shortly thereafter, the reversed polarity output signals of operational amplifier 16 in conductor 71 and 73 are supplied to switches 80 and 82 in circuit means 661. However, as the polarity of the field current signals in coils 84 and 86 of these switches is not reversed, but is only decreasing, the state of switches 80 and 82 is unchanged.

Switches 82 stay open and the reversed inverse output signal in conductor 73 has no effect on the operation of circuit means 66. Switch 80, being closed continues to provide a reversed direct output signal of operational amplifier 16 in conductor 71 to conductor 75 as the controlling signal 8 to armature circuit 20.

As this signal is of the opposite polarity, i.e. negative polarity, from the controlling signal in conductor 75 prior to time $T_1$, that is, during motoring operation, it is of a polarity to force the output of armature controlled rectifier firing circuit 64 immediately to zero which, in turn, reduces the armature energization to zero. The reduction of the armature energization to zero will be quite rapid due to the negative polarity of the controlling signal and will be far more rapid than the energization reduction provided by an armature current feedback signal or by the time constants of the armature circuit, in the absence of any signal thereto.

The forcing provided by circuit means 661 continues until just prior to the time the field current reaches zero. When the field current approaches zero, as for example, time $T_{2A}$ in FIGURE 4, the magnetic field created by the field current polarity signal in coil 84 becomes insufficient to hold switch leaves 88 in contact and switch 80 opens. This removes the controlling signal 8 corresponding to the direct output signal of operational amplifier 16 in conductor 71 from firing circuit 64.

At time $T_2$, the field current falls to zero and starts to reverse. At time $T_{2B}$, the field current in the opposite direction has built up to a sufficient magnitude to cause a reversed field current polarity signal in conductor 69 that energizes coil 86 to bring switch leaves 90 into contact and close switch 82. This supplies the inverse output signal of operational amplifier 16 in conductor 73 to conductor 75 and armature controlled rectifier firing circuit 64 are controlling signal 8. The field current polarity signal in conductor 68 is blocked by rectifier 94. Due to the reversal of polarity of the inverse output signal in conductor 73, its polarity is now positive and is such as to tend to increase the energization of motor armature 24. The signal operates armature controlled rectifier firing circuit 64 to fire the controlled rectifiers in bridge 62 in the portion of the negative half cycle of the AC supply in which the AC supply voltage is more positive than the reversed counter E.M.F. to cause motor 24 to regenerate power back to the AC supply.

For operation of motor 22 in the reverse direction, the operation of control 10 in FIGURE 1 is reversed, starting with a reversal of the reference signal in conductor 32 to the negative polarity. This, of course, reverses the polarity of the error signal. The reversed error signal operates field circuit 18 to supply field current in terminal 46 of the motor field and out terminal 44. The field current polarity signal thus produced operates relay 204 to connect conductor 32 to conductor 198 and conductor 36 to 196. This is the reversed switching state of circuit means 66 so that even though the error signal is reversed, the controlling signal supplied to armature control rectifier firing circuit 64 is of the positive polarity to energize armature 24 and accelerate motor 22 in the motoring state.

Regenerative operation in the reversed operation of motor rotation is analogous, but opposite to, the operation described above in connection with the forward direction of motor rotation and requires that relay 204 be de-energized and relay 202 be energized by the field current polarity signals.

In control 10 of FIGURE 2 the reversal of the polarity of the error signal reverses the polarities of the direct and inverse output signals of operational amplifier 16 in conductors 71 and 73 so that the inverse output signal in conductor 73 is of a polarity to cause armature controlled rectifier firing circuit 64 to energize armature 24 during motoring operation and of the polarity to force the energization of the armature rapidly to zero at the initiation of the transient period. The reversed polarity of the inverse output signal in conduct 41 energizes motor field 26 in the reverse direction and provides a field current polarity signal in conductor 69 which closes switch 82 in circuit means 661 to supply the inverse output signal in conductor 73 to conductor 75 and armature controlled rectifier firing circuit 64.

An additional feature of the present invention is that if, at any time during the portion of the transient period, $T_1$ to $T_{2a}$, that is, during the time the field is weakening but has not reversed, the error signal between conductor 32 and conductor 36 indicates that a momentary application of power to motor 22 is necessary, circuit means 66 or 661 may provide such a momentary application of power. Specifically, and using the control 10 of FIGURE 2 as an example, the polarity of the error signal will reverse as the regulating signal from regulating signal source 30 exceeds the feedback signal in conductor 36 indicating that motoring operation is necessary and control 10 will revert to motoring operation. The polarity of the direct output signal of operational amplifier 16 in conductor 71 also reverses to the positive polarity as the error signal reverses. Switch 80 remains closed, as the field circuit polarity signal in conductor 68 is strengthened, and supplies the reversed direct output signal of operational amplifier 16 to the input of armature controlled rectifier firing circuit 64 to cause that circuit to energize the motor armature 22 to accelerate the motor. As soon as motor 22 accelerates a sufficient amount to cause the feedback signal to exceed the reference signal, the direct signal in conductor 71 reverses to the condition shown in FIGURE 4 between $T_1$ and $T_{2a}$ to provide a controlling signal to firing circuit 64 which forces the output of the firing circuit and the armature current rapidly to zero as the field current again starts to decay.

Figure 3:
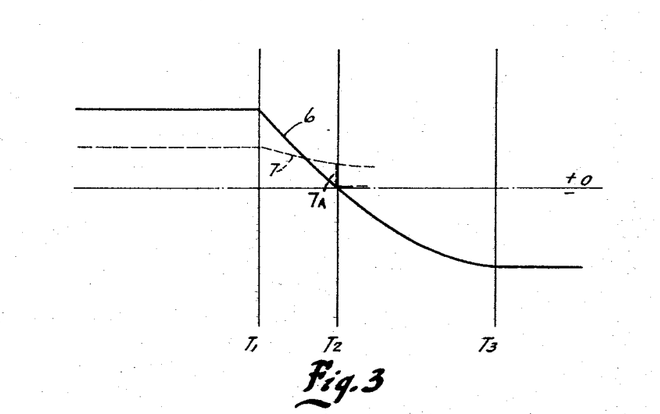
FIGURE 3 is a graph showing electrical conditions existing in prior art regenerative direct current motor controls.

Although, control 10 has been described as having a means for sensing the polarity and magnitude of the field current, such as resistors 58 and 59, in the field circuit 18, it will be appreciated that a separate circuit operated by the input signal to the control and having time constant characteristics corresponding to the inductive characteristics of the motor field, such as is shown in FIGURES 3 and 4, may be used. The term means providing field current polarity signals is to be construed as including such means.

The detailed schematic diagram of switching means 79 is shown in FIGURE 7. The circuit is energized by a power supply consisting of transformer 102 having the primary winding connected to AC supply lines 28 and the secondary winding connected to diodes 104 and 106 and capacitor 108 and capacitor 110.

The power supply powers a driving amplifier 112. Transistors 114, 116, 118, and 120, along with appropriate input and biasing circuitry, form a conventional differential amplifier, one output of which is connected to coil 84, of switch 80, the other output of which is connected to coil 86 of switch 82. The two inputs to amplifier 112 comprise the field current polarity signal in conductor 68 which, through transistor 116 and 120, energizes coil 84 and the field current polarity signal in conductor 69 which, through transistors 114 and 118, energizes coil 86. Transistors 118 and 120 are biased off by Zener diode 122 when no input signals are supplied to amplifier 112.

The inverse and direct output signals of operational amplifier 16, in conductors 71 and 73, respectively, are supplied to circuit 79 at terminals 124 and 126. If it is desired to adjust the magnitude of the inverse or direct output signal of operational amplifier 16 by a constant value as for example to provide a controlling signal to armature circuit 20 of one magnitude for motoring operation and a control signal of a different magnitude for regenerative operation, conductors 71 and 73 may be attached to terminals 128 and 130. The output signals are then passed through rheostats 132 and 134 and a portion of the signals tapped off by wipers 136 and 138 and supplied to terminals 140 and 150. Terminals 140 and 150 are connected by jumpers to terminals 124 and 126. Diodes 152 and 154 and 156 and 158 are connected to terminals 128 and 130 to insure that the magnitude of the output signals of operational amplifier 16 are at least in excess of the forward voltage drop of diodes 152 through 158 before a controlling signal is supplied to the input of armature controlled rectifier firing current 64. This insures that motor field 26 will be on before a controlling signal is supplied to armature controlled rectifier firing circuit 64.

The inverse and direct output signals of operational amplifier 16 are provided to conductor 75 through switch leaves 88 and 90.

While the arrangements of the invention described herein are, at present, considered to be preferred, it is understood that variations and modifications may be made therein and it is intended to cover in the appended claims all such variations and modifications as fall within the true scope and spirit of the invention.

I claim:

1. A regenerative direct current motor control for regulating the energization of the field winding and the armature winding of a direct current motor from an alternating current power source in accordance with a bi-polarity motor operative condition error signal, said control comprising in combination:

a field circuit means connected to the field winding and operable by an input signal corresponding to the error signal for providing current energization in either direction from the power source through said motor field winding, said field circuit means reversing the field winding current energization during a transient period initiated in response to a reversal of the polarity of the error signal, said field circuit means including means providing field winding current direction signals;

an armature circuit means connected to the armature winding of the motor for energizing the armature winding from the power source responsive to a controlling signal of one polarity and for reducing the armature winding energization to zero responsive to a controlling signal of the other polarity, the energization of the armature winding providing motoring operation to the motor for one direction of field winding current energization and providing regenerative operation to the motor, for the motoring direction of motor rotation, for the other direction of field winding current energization; and a circuit means having an output connected to said armature circuit means and an input receiving an input signal corresponding to the bi-polarity error signal, said circuit means being capable of transmitting both polarities of the circuit means input signal between the input and output of the circuit means and having a pair of transmitting states for providing the input signal as the controlling signal to the armature circuit means, said circuit means being connected to said means providing field winding current direction signals and sequentially operable between said transmitting states by said signals for initially placing said circuit means in a first transmitting state when the field winding current flow is in one direction and for subsequently placing said circuit means in a second transmitting state when the field winding current has reversed to the other flow direction, said circuit means providing, when in the first transmitting state, a controlling signal to said armature circuit means corresponding to the error signal and of a polarity to energize the armature winding prior to the transient period and of a polarity to reduce the armature winding energization to zero subsequent to the initiation of the transient period, said circuit means providing, when in the second transmitting state, a controlling signal to said armature circuit means corresponding to the error signal and of a polarity to energize the armature winding.

2. The regenerative direct current motor control of claim 1 further defined in that the circuit means includes switching means interposed between the input and output of said circuit means, said switching means being operable by electric signals and being connected to the means providing field winding current direction signals for operating said switching means responsive to said signals to place said circuit means in one or the other of the transmitting states.

3. The regenerative direct current motor control of claim 2 wherein said switching means comprises a signal polarity reversing switch interposed between the input and output of said circuit means, said reversing switch being connected to said means providing field winding current direction signals and operable by said signals between a normal polarity transmitting state comprising said first transmitting state and a reversed polarity transmitting state comprising said second transmitting state.

4. The regenerative direct current motor control of claim 3 wherein said reversing switch comprises a pair of switching means interposed between the input and output of said circuit means, said pair of switching means being operable by said field winding current direction signals between the normal polarity transmitting state and the reversed polarity transmitting state.

5. The regenerative direct current motor control of claim 1 wherein said circuit means includes a signal means for receiving the error signal, said signal means producing a pair of output signals of opposite polarities comprising a direct output signal directly proportional in magnitude and corresponding in polarity to the error signal and inverse output signal proportional in magnitude but inverse in polarity to the error signal, one polarity of said pair of output signals corresponding to the polarity of the controlling signal energizing the armature winding, the other polarity of the pair of output signals corresponding to the polarity of the controlling signal reducing the armature winding energization to zero, and wherein said circuit means includes a switching means for receiving said pair of output signals, said switching means being capable of transmitting either polarity of each of the output signals from the signal means to the output of said circuit means and having a pair of transmitting states for providing one of the output signals as the controlling signal to the armature circuit means, said switching means being connected to said means providing field winding current direction signals and operable between said transmitting states by said signals, said circuit means providing, when said switching means is in the first transmitting state, a controlling signal to said armature circuit means comprised of the one of said output signals of the polarity to energize the armature winding prior to the transient period and of the polarity to reduce the armature winding energization to zero subsequent to the initiation of the transient period, said circuit means providing, when said switching means is in the second transmitting state, a controlling signal to said armature circuit means comprised of the one of said output signals of the polarity to energize the armature winding.

6. The regenerative direct current motor control of claim 5 further defined in that said switching means includes a pair of switches, each of which receives one of said pair of output signals and is capable of transmitting either polarity of the output signal when in the transmitting state, each of said switches being connected to said means providing field current direction signals and being responsive to a field winding current direction signal corresponding to one direction of field winding current flow to operate it into the transmitting state.

7. The regenerative direct current motor control of claim 6 wherein said switches are magnetic reed switches.

8. The regenerative direct current motor control of claim 6 wherein said switches are semi-conductor switching devices.

9. The regenerative direct current motor control of claim 6 including an amplifier connected to, and amplifying, said field current polarity signals.

10. A circuit means for controlling the motor armature circuit means of a regenerative direct current motor control, said control being operable by a bi-polarity motor operative condition error signal and providing for regenerative operation of the motor by reversing the flow direction of the motor field winding current energization, the control including means providing field current direction signals indicating the direction of field winding current flow, said circuit means providing a bi-polarity controlling signal to the armature circuit means for energizing the armature winding of the motor when of one polarity and for reducing the armature winding energization to zero when of the other polarity, said reduction occurring during the transient period between motoring and regenerative operation initiated in response to a reversal of the polarity of the bi-polarity error signal and during which the field winding current reverses from one flow direction to the other through zero, said control including a signal means having an input receiving said error signal and producing a pair of output signals of opposite polarities comprising a direct output signal directly proportional in magnitude and corresponding in polarity to the error signal and an inverse output signal proportional in magnitude but inverse in polarity to the error signal, one polarity of said pair of signals corresponding to the polarity of the controlling signal energizing the armature winding, the other polarity of said pair of signals corresponding to the polarity of the controlling signal reducing the armature winding energization to zero, said circuit means comprising:

a switching means having an input connected to the signal means for receiving the pair of output signals and an output connected to the motor armature circuit means, said switching means being capable of transmitting either polarity of each of the output signals from the signal means to the armature circuit means and having a pair of transmitting states for providing one of the output signals as the controlling signal to the armature circuit means, said switching means connected to the means providing field winding current direction signals and sequentially operable by said signals for initially placing said switching means in a first transmitting state when the field winding current flow is in one direction and for subsequently placing said switching means in a second transmitting state when the field winding current has reversed to the other flow direction, said circuit means providing, when said switching means is in the first transmitting state, a controlling signal to said armature circuit means comprised of the one of said output signals of the polarity to energize the armature winding prior to the transient period and of the polarity to reduce the armature winding energization to zero subsequent to the initiation of the transient period, said circuit means providing, when said switching means is in the second transmitting state, a controlling signal to said armature circuit means comprised of the one of said output signals of the polarity to energize the armature winding.

11. A circuit means for controlling the motor armature circuit means of a regenerative direct current motor control, said control being operable by a bi-polarity motor operative condition error signal and providing for regenerative operation of the motor by reversing the flow direction of the motor field winding current energization, said control including means providing field winding current direction signals, said circuit means providing a bi-polarity controlling signal to the armature circuit means for energizing the motor armature winding when of one polarity and for reducing the armature winding energization to zero when of the other polarity, said reduction occurring during the transient period between motoring and regenerative operation initiated in response to a reversal of the polarity of said bi-polarity error signal and during which the field winding current reverses from one flow direction to the other through zero, said circuit means comprising:

a signal means having an input for receiving the error signal and producing a pair of output signals of opposite polarities comprising a direct output signal directly proportional in magnitude and corresponding in polarity to the error signal and an inverse output signal proportional in magnitude but inverse in polarity to the error signal, one polarity of the pair of signals corresponding to the polarity of the controlling signal energizing the armature winding, the other polarity of the pair of signals corresponding to the polarity of the controlling signal reducing the armature winding energization to zero; and a switching means having an input connected to said signal means for receiving the pair of output signals and an output connected to the armature circuit means, said switching means being capable of transmitting either polarity of each of the output signals from said signal means to the armature circuit means and having a pair of transmitting states for providing one of the output signals as the controlling signal to the armature circuit means, said switching means connected to the means providing field winding current direction signals and sequentially operable by said signals for initially placing said switching means in a first transmitting state when the field winding current flow is in one direction and for subsequently placing said switching means in a second transmitting state when the field winding current has reversed to the other direction, said circuit means providing, when said switching means is in the first transmitting state, a controlling signal to said armature circuit means comprised of the one of said output signals of the polarity to energize the armature winding prior to the transient period and of the polarity to reduce the armature winding energization to zero subsequent to the initiation of the transient period, said circuit means providing, when said switching means is in the second transmitting state, a controlling signal to said armature circuit means comprised of the one of said output signals of the polarity to energize the armature winding.

12. A circuit means of claim 10 wherein said switching means includes a pair of switches, each of which receives of said pair of output signals and is capable of transmitting either polarity of the output signal when in the transmitting state, each of said switches being connected to said means providing field current direction signals and being responsive to a field winding current direction signal corresponding to one direction of field winding current flow for operating it into the transmitting state.

13. A circuit means for controlling the motor armature circuit means of a regenerative direct current motor control, said control being operable by a bi-polarity motor operative condition error signal and providing for regenerative operation of the motor by reversing the flow direction of the motor field winding current energization, the control including means providing field winding current direction signals indicating the direction of field winding current flow, said circuit means providing a bi-polarity controlling signal to the armature circuit means for energizing the armature winding of the motor when of a one polarity and for reducing the armature winding energization to zero when of the other polarity, said reduction occurring during the transient period between motoring and regenerative operation initiated in response to a reversal of the bi-polarity error signal and during which the field winding current reverses from one flow direction to another through zero, said circuit means comprising:

a signal polarity reversing switch having an input receiving said error signal and an output connected to said armature circuit means, said reversing switch being connected to said means providing field winding current direction signals and sequentially operable between a normal signal polarity transmitting state and a reversed signal polarity transmitting state by said signals for initially placing said circuit means in the normal transmitting state when the field winding current flow is in one direction and for subsequently placing said circuit means in the reversed transmitting state when the field winding current has reversed to the other flow direction, said reversing switch providing, when in the normal transmitting state, a controlling signal to said armature circuit means corresponding to the error signal and of a polarity to energize the armature winding prior to the transient period and of a polarity to reduce the armature winding energization to zero subsequent to the initiation of the transient period, said reversing switch providing, when in the reversed transmitting state, a controlling signal to said armature circuit means corresponding to the error signal and of a polarity to energize the armature winding.

14. The circuit means of claim 13 wherein said reversing switch comprises a pair of switching means receiving said bi-polarity error signal and connected to said armature circuit, said pair of switching means being operable by said field current direction signals between the normal polarity transmitting state and the reversed polarity transmitting state.

References Cited

UNITED STATES PATENTS

| | | | |
|---|---|---|---|
| 3,344,328 | 9/1967 | Morris | 318—258 |
| 3,401,325 | 9/1968 | Stringer | 318—302 |

ORIS L. RADER, Primary Examiner

ROBERT J. HICKEY, Assistant Examiner

U.S. Cl. X.R.

318—327, 338